United States Patent
Uchida

(10) Patent No.: US 7,310,531 B2
(45) Date of Patent: Dec. 18, 2007

(54) TRANSMISSION RATE CHANGING METHOD, AND BASE STATION APPARATUS USING THE SAME

(75) Inventor: Yoshinori Uchida, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 72 days.

(21) Appl. No.: 10/849,057

(22) Filed: May 20, 2004

(65) Prior Publication Data

US 2004/0233869 A1 Nov. 25, 2004

(30) Foreign Application Priority Data

May 23, 2003 (JP) .............................. 2003-146053

(51) Int. Cl.
*H04Q 7/20* (2006.01)
(52) U.S. Cl. .................. 455/450; 455/67.3; 370/252; 370/345
(58) Field of Classification Search ............ 455/67.13, 455/450, 67.3; 370/252, 345
See application file for complete search history.

(56) References Cited

U.S. PATENT DOCUMENTS 6,167,031 A * 12/2000 Olofsson et al. ............ 370/252

FOREIGN PATENT DOCUMENTS

| EP | 0 903 883 A2 | 3/1999 |
|---|---|---|
| EP | 1 229 748 A1 | 8/2002 |
| EP | 0 903 883 | 9/2004 |
| EP | 1 229 748 | 9/2004 |
| JP | 08-274756 | 10/1996 |
| JP | 2002-290246 | 10/2002 |
| WO | WO 01/99384 A2 | 12/2001 |
| WO | WO 02/45274 A2 | 6/2002 |

OTHER PUBLICATIONS

XP-010353676 (submitted in IDS of Sep. 22, 2004).
Ho, Joseph., et al. "Throughput and Buffer Analysis for GSM General Packet Radio Service." Wireless Communications and Networking Conference, 1999, WCNC. 1999 IEEE New Orleans, LA, USA, Sep. 21-24, 1999, Piscataway, NJ, USA, IEEE, US, Sep. 21, 1999, pp. 1427-1431, XP010353676.
Japanese Office Action, Dispatch Date: Jan. 17, 2006.

* cited by examiner

*Primary Examiner*—Joseph Feild
*Assistant Examiner*—Pierre-Louis Desir
(74) *Attorney, Agent, or Firm*—McDermott Will & Emery LLP

(57) ABSTRACT

The modulation/demodulation unit modulates information to be transmitted, or demodulates information received. The time slot control unit assigns time slots to a terminal apparatus when the base station apparatus establishes connection with the terminal apparatus. The quality derivation unit derives the quality of the transmission links as appropriate. The modulation mode control unit determines the modulation modes suitable for the quality of the transmission links for the up link and down link, respectively. Moreover, when the remaining period of the time slots is greater than or equal to a threshold value, the modulation mode control unit determines to change the modulation modes currently in use into the modulation modes determined. When the remaining period is smaller than the threshold value, the modulation mode control unit determines to keep using the modulation modes currently in use without changing to the modulation modes determined.

12 Claims, 9 Drawing Sheets

FIG.2

| D/U | MODULATION MODE |
|---|---|
| A AND ABOVE | 16QAM |
| A – B | QPSK |
| BELOW B | BPSK |

FIG.5

| USER ID | ALLOCATED SLOTS | SLOT CLASSIFICATION | MODULATION MODE (UP) | MODULATION MODE (DOWN) |
|---|---|---|---|---|
| AABBCCDD | #2, #6 | α | 16QAM | 16QAM |
| EFGHIJKL | #3, #7 | α | QPSK | QPSK |
| MMNNOOPP | #4, #8 | α | QPSK | QPSK |
| QRSTUVWX | #2, #6 | β | QPSK | QPSK |
| HGFEDCBA | #3, #7 | β | 16QAM | 16QAM |
| LLKKJJII | #4, #8 | β | 16QAM | 16QAM |

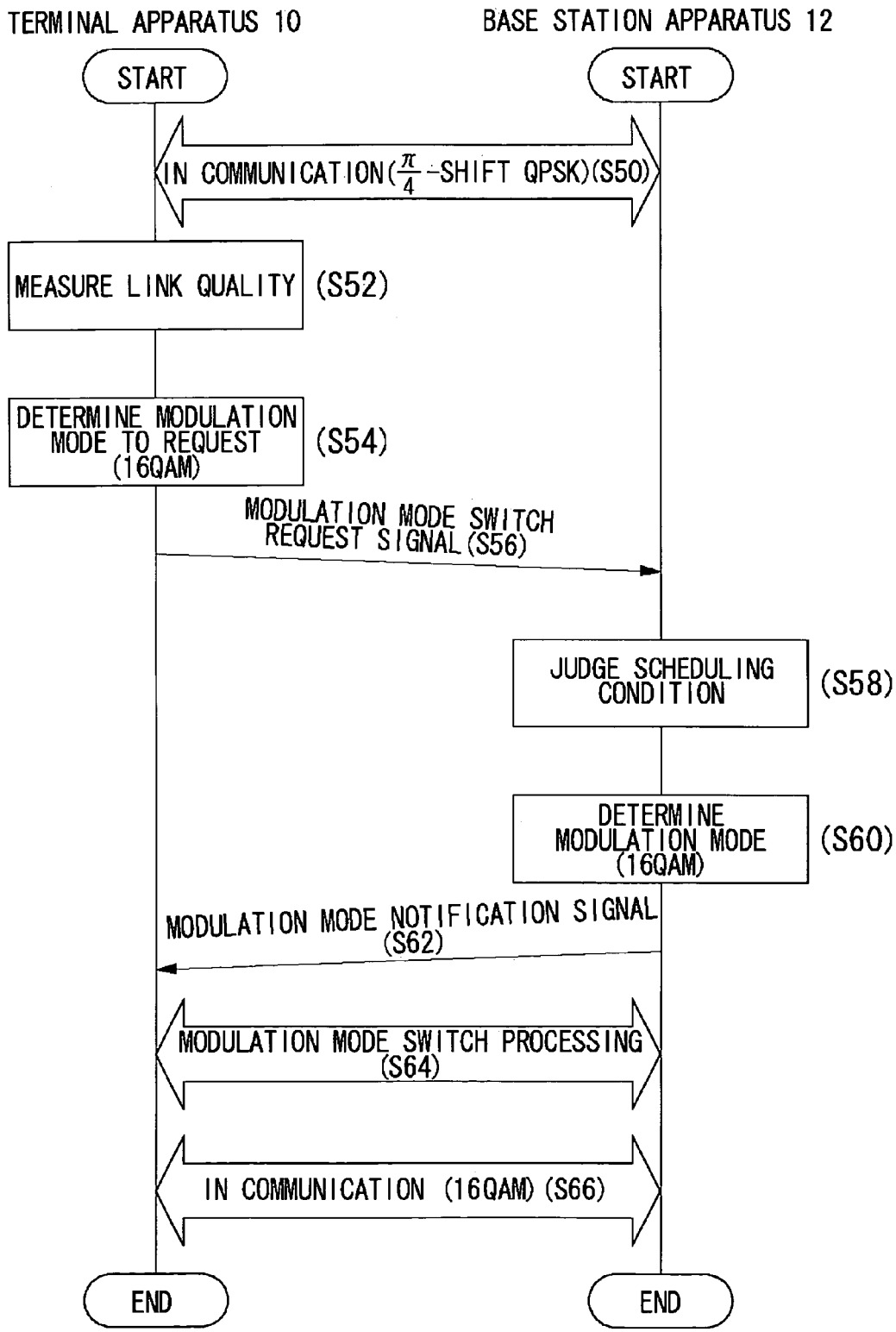

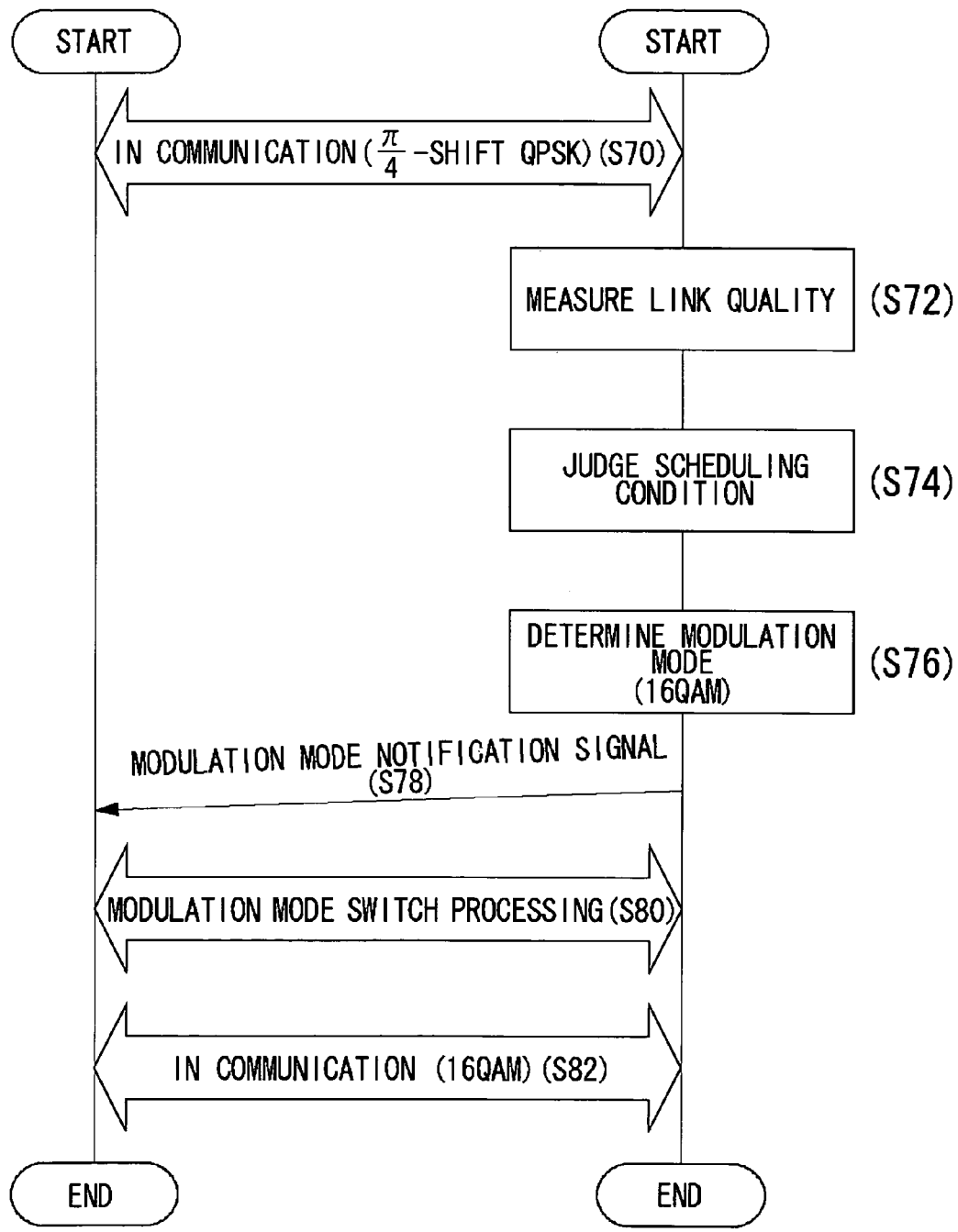

TRANSMISSION RATE CHANGING METHOD, AND BASE STATION APPARATUS USING THE SAME

BACKGROUND OF THE INVENTION

1. Field of the Invention

The present invention relates to a transmission rate changing technology. In particular, the invention relates to a transmission rate changing method for changing a transmission rate during communication, and a base station apparatus using the same.

2. Description of the Related Art

In wireless communication systems, transmission links vary in environment with time. Among technologies for increasing the transmission rate in such transmission link environment is adaptive modulation scheme. The adaptive modulation scheme controls its modulation mode in accordance with the transmission link environment. For example, if the transmission link environment is determined to be unfavorable, a modulation mode of high reliability is used for data transmission. If the transmission link environment is determined to be favorable, on the other hand, a modulation mode of high information volume is used for data transmission. When a base station apparatus and a terminal apparatus included in a wireless communication system communicate by TDD (Time Division Duplex) scheme, slots are typically transmitted for an up link and a down link alternately in regular order.

Each of the slots contains a preamble to be used for estimating the transmission link environment, modulation mode information indicating the modulation mode used for transmission, and information symbols. When the transmission links of TDD scheme are reversible, the base station apparatus receives a slot, detects the C/N (Carrier to Noise Ratio) of the transmission links, delay spread, and from received level information including a received baseband signal and RSSI (Received Signal Strength Indicator), and estimates the transmission link environment at the next timing of transmission. Besides, based on this estimation result, the base station apparatus selects a modulation mode to be used for transmission (See reference (1) in the following Related Art List, for instance).

Related Art List (1) Japanese Patent Application Laid-Open No. 2002-290246.

Under the circumstances, the inventor has become aware of the following problems. According to the conventional art, the base station apparatus determines to change the modulation modes for use in communication with the terminal apparatus, and instructs or notifies the terminal apparatus of the change. In addition to this, the change of the modulation modes for communications between the base station apparatus and the terminal apparatus sometimes requires that a plurality of signals be transmitted/received therebetween. For example, when the base station apparatus instructs the terminal apparatus to change from QPSK (Quadrature Phase Shift Keying) to 16 QAM (Quadrature Amplitude Modulation), the terminal apparatus transmits 16-QAM control signals to the base station apparatus a plurality of times. The base station apparatus receives these control signals by using QPSK continuously, and if a predetermined number of receiving errors occur, recognizes that the modulation mode for the terminal apparatus is changed. Moreover, predetermined signals may sometimes be transmitted/received between the base station apparatus and the terminal apparatus for the sake of link establishment.

When the base station apparatus multiplexes a plurality of terminal apparatuses by TDMA (Time Division Multiple Access), it typically allocates predetermined slots included in a single frame to the terminal apparatuses. If the number of terminal apparatuses to multiplex is greater than the number of slots included in a single frame, a plurality of slots included in more than one frame are allocated to the plurality of terminal apparatuses, respectively. In the foregoing case, the slot allocation sometimes involves such control that slots are allocated to certain terminal apparatuses over a plurality of consecutive frames while no slot is allocated to the other terminal apparatuses over the plurality of consecutive frames. Here, after a lapse of the plurality of consecutive frames, the terminal apparatuses for slots to be allocated to are switched. Suppose, for example, that a single slot included in a single frame is allocated to a first terminal apparatus and a second terminal apparatus alternately in cycles of 100 frames. In this case, the slot is allocated to the first terminal apparatus from frame 1 to frame 100, for the second terminal apparatus from frame 101 to frame 200, and for the first terminal apparatus from frame 201 to frame 300.

Now, if such a base station apparatus as described above, which allocates slots to terminal apparatuses in units of a finite number of consecutive frames and transmits/receives a plurality of signals for changing modulation modes, starts changing the modulation modes with only a short period of the consecutive frames for slot allocation remaining, the transmission and receiving of the plurality of signals needed to change the modulation modes can further shorten the remaining period of the frames substantially available for data communication.

SUMMARY OF THE INVENTION

The inventor has achieved the present invention in view of the foregoing. It is thus an object of the present invention to provide a transmission rate changing method for changing a transmission rate with consideration given to the transmission efficiency, and a base station apparatus using the same.

One of the aspects of the present invention is a base station apparatus. This apparatus comprises: a communication unit which communicates with a terminal apparatus at variable transmission rates; a channel allocation unit which allocates a channel to the terminal apparatus over a predetermined period; a change planning unit which plans timing for changing a transmission rate for the terminal apparatus in the channel-allocated period; and a change determination unit which determines whether or not it perform the change of the transmission rate for the terminal apparatus, based on the timing for changing the transmission rate planned by the change planning unit in the channel-allocated period.

The "channel" refers to a wireless communication channel that is established for the sake, of communication between the base station apparatus and a wireless apparatus such as the terminal apparatus. Specifically, it refers to a certain frequency band in the case of FDMA (Frequency Division Multiple Access), a certain slot or time slot in the case of TDMA, and a certain code sequences in the case of CDMA (Code Division Multiple Access). These terms will not be distinguished here.

The apparatus described above determines to change the transmission rate based on the channel-allocated period and the planned timing for changing the transmission rate. It is therefore possible to perform the change of the transmission rate with consideration given to the temporal limitation on the channel, thus achieving an improved transmission rate.

The base station apparatus may further comprises a link quality derivation unit which derives link quality with respect to the terminal apparatus. Here, the change determination unit may derive a remaining period of the channel for the case of changing the transmission rate, based on a length of the channel-allocated period and the planned timing for changing the transmission rate, and further determine to perform the change of the transmission rate based on the derived link quality depending on the derived remaining period of the channel.

"Derive the remaining period of the channel" shall involve the cases of acquiring the remaining period directly from the length of the channel-allocated period and the planned timing for changing the transmission rate without performing a new calculation.

For the link quality with respect to the terminal apparatus, the link quality derivation unit may measure link quality based on a signal received from the terminal apparatus. Alternatively, for the link quality with respect to the terminal apparatus, the link quality derivation unit may detect information on link quality which is included in a signal received from the terminal apparatus.

The "link quality" has only to be an index that indicates the quality of the transmission link for signal transmission, including a signal intensity and a signal error rate.

Another aspect of the present invention is a transmission rate changing method. This method comprises: making a plan for changing a transmission rate in a period during which a channel is allocated to a terminal apparatus; and determining whether or not it perform the plan, through calculation using a criterion determined with consideration given to a drop in transmission efficiency resulting from the execution of the plan.

The method described above determines to change the transmission rate with consideration given to the drop in transmission efficiency resulting from the change of the transmission rate. It is therefore possible to improve the substantial transmission rate.

Still another aspect of the present invention is also a transmission rate changing method. This method comprises: allocating a channel to a terminal apparatus over a predetermined period; planning timing for changing a transmission rate for the terminal apparatus in the channel-allocated period; and determining whether or not to change the transmission rate at the planned timing based on the planned timing in the channel-allocated period.

According to the method described above, whether or not to change the transmission rate at the planned timing is determined based on the planned timing in the channel-allocated period. It is therefore possible to change the transmission rate with consideration given to the temporal limitation of the channel, thus achieving an improved transmission rate.

The method may further comprise deriving link quality with respect to the terminal apparatus. In determining whether or not to change the transmission rate at the planned timing based on the planned timing in the channel-allocated period, the remaining period of the channel for the case of changing the transmission rate may be derived from a length of the channel-allocated period and the planned timing for changing the transmission rate in planning timing for changing a transmission rate. Then, whether or not to perform the change of the transmission rate based on the derived link quality may be determined depending on the derived remaining period of the channel.

In deriving the link quality with respect to the terminal apparatus, link quality based on a signal received from the terminal apparatus is measured as the link quality with respect to the terminal apparatus. In deriving the link quality with respect to the terminal apparatus, information on link quality included in a signal received from the terminal apparatus may be detected as the link quality with respect to the terminal apparatus.

Still another aspect of the present invention is a program. This program comprises: allocating a channel to a terminal apparatus via a wireless network over a predetermined period; planning timing for changing a transmission rate for the terminal apparatus in the channel-allocated period; and determining whether or not to change the transmission rate at the planned timing based on the planned timing in the channel-allocated period.

The program may further comprise deriving link quality with respect to the terminal apparatus via the wireless network. In determining whether or not to change the transmission rate at the planned timing based on the planned timing in the channel-allocated period, the remaining period of the channel for the case of changing the transmission rate may be derived from a length of the channel-allocated period and the planned timing for changing the transmission rate in planning timing for changing a transmission rate. Then, whether or not to perform the change of the transmission rate based on the derived link quality may be determined depending on the derived remaining period of the channel.

In deriving the link quality with respect to the terminal apparatus via the wireless network, link quality based on a signal received from the terminal apparatus via the wireless network may be measured as the link quality with respect to the terminal apparatus. In deriving the link quality with respect to the terminal apparatus via the wireless network, information on link quality included in a signal received from the terminal apparatus via the wireless network may be detected as the link quality with respect to the terminal apparatus.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 2 shows a data structure of a storing unit of FIG. 1;

FIG. 5 shows a data structure of a time slot management unit of FIG. 4;

FIG. 8 is a sequence diagram showing modulation mode change processing for a down link of FIG. 1; and FIG. 9 is a sequence diagram showing modulation mode change processing for an up link of FIG. 1.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

The present embodiment relates to a base station apparatus which allocates times slots to a plurality of terminal apparatuses over a predetermined period (hereinafter, the period of allocation of time slots will be referred to as "time slot allocation period") in order to establish multiplex connection with the terminal apparatuses, and performs adaptive modulation with respect to each of the terminal apparatuses during the time slot allocation period. Here, the base station apparatus requires a predetermined period at the time of the processing for changing the modulation mode (hereinafter, this period will be referred to as "change processing period") since a plurality of signals must be transmitted/received to/from the terminal apparatuses.

The base station apparatus according to the present embodiment measures the link quality of the up links from received signals, and determines the modulation modes of the up links based on the link quality measured. In contrast, the base station apparatus is notified of the modulation modes suitable for the down links by the terminal apparatuses, and determines the modulation modes of the down links based on the notified information. Moreover, it derives the remainder of the time slot allocation period for the case of changing a modulation mode (hereinafter, referred to as "remaining period"), based on the timing at which the change of the modulation mode is performed (hereinafter, referred to as "scheduled timing") and the time slot allocation period. If the remaining period is greater then or equal to a predetermined threshold value, the base station apparatus makes the change to the determined modulation mode.

Figure 1:
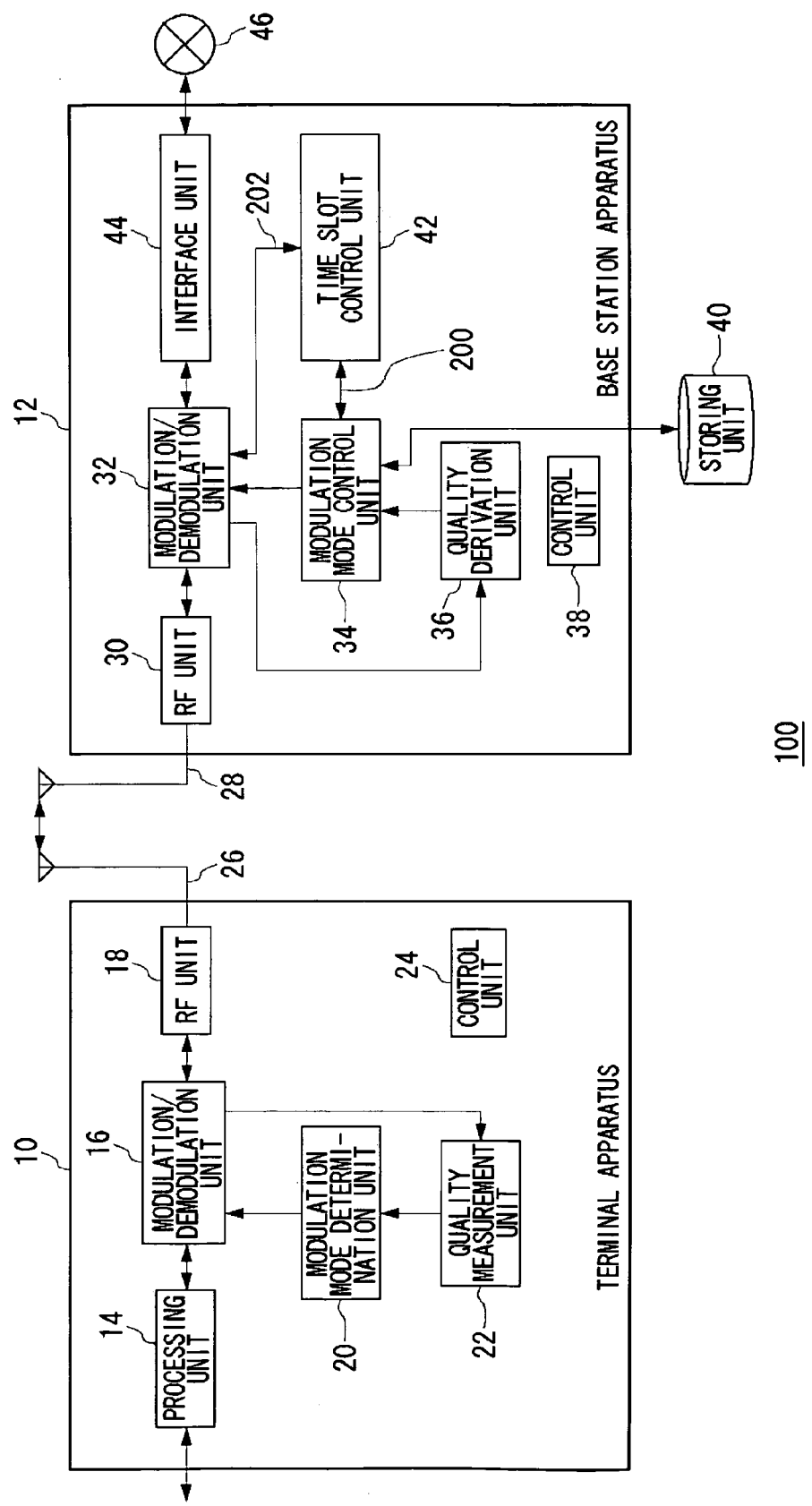
FIG. 1 shows a communication system according to an embodiment of the present invention.

FIG. 1 shows a communication system 100 according to the present embodiment. The communication system 100 includes a terminal apparatus 10, a base station apparatus 12, and a network 46. The terminal apparatus 10 includes a processing unit 14, a modulation/demodulation unit 16, an RF unit 18, a modulation mode determination unit 20, a quality measurement unit 22, a control unit 24, and a terminal antenna 26. The base station apparatus 12 includes a base station antenna 28, an RF unit 30, a modulation/demodulation unit 32, a modulation mode control unit 34, a quality derivation unit 36, a control unit 38, a storing unit 40, a time slot control unit 42, and an interface unit 44. The signals include period information 200 and time slot information 202.

The processing unit 14 functions as an interface for inputting/outputting data from/to exterior of the terminal apparatus 10. When received data contains some error, the processing unit 14 performs retransmission processing. Moreover, when the terminal apparatus 10 has an error correcting function, the processing unit 14 encodes information to be transmitted and decodes information received.

The modulation/demodulation unit 16 modulates information to be transmitted and demodulates information received. Here, the modulation/demodulation unit 16 handles any one of modulation modes of BPSK (Binary Phase Shift Keying), π/4-shift QPSK, and 16 QAM. In addition, the modulation mode shall be changed adaptively. Demodulation involves coherent detection for 16 QAM, and differential detection for BPSK and π/4-shift QPSK. Incidentally, the modulation mode is determined by the base station apparatus 12 to be described later. The modulation/demodulation unit 16 performs processing corresponding to the determined modulation mode according to a predetermined instruction signal from the base station apparatus 12.

The quality measurement unit 22 measures the quality of the received signal as appropriate. The quality of the received signal may be arbitrary. Here, the quality measurement unit 22 measures for the intensity of a desired signal received, the intensity of an interference signal received, the intensity ratio between the desired signal and the interference signal, etc from the signal demodulated by the modulation/demodulation unit 16 or RSSI. The quality measurement unit 22 may measure for error ratios from the signal demodulated by the modulation/demodulation unit 16.

The modulation mode determination unit 20 determines, from the signal quality measured by the quality measurement unit 22, the modulation mode corresponding to the measured quality, and generates a signal for notifying the base station apparatus 12 of the modulation mode determined. For example, assuming that the signal quality is the intensity ratio between the desired signal and the interference signal, a first reference value and a second reference value are defined and stored in advance such that the first reference value has a level higher than that of the second reference value. If the measured intensity ratio is higher than or equal to the first reference value, the modulation mode is determined to be 16 QAM. If the measured intensity ratio is lower than the first reference value and higher than or equal to the second reference value, the modulation mode is determined to be π/4-shift QPSK. If the measured intensity ratio is lower than the second reference value, the modulation mode is determined to be BPSK.

The RF unit 18 performs frequency conversion between baseband signals to be processed by the modulation/demodulation unit 16 and radio frequency signals, amplification, AD or DA conversion and so on.

The terminal antenna 26 transmits and receives the radio frequency signals. Incidentally, the terminal antenna 26 may be any of a nondirectional antenna, a predetermined directional antenna, and an adaptive array antenna. Diversity facilities may also be provided.

The control unit 24 performs timing processing of the terminal apparatus 10, processing of control signals, etc.

The base station antenna 28 transmits and receives radio frequency signals as with the terminal antenna 26. The base station antenna 28 may also be any of a nondirectional antenna, a predetermined directional antenna, and an adaptive array antenna. Diversity facilities may also be provided.

The RF unit 30 performs frequency conversion between baseband signals to be processed by the modulation/demodulation unit 32 to be described later and the radio frequency signals, amplification, AD or DA conversion and so on.

The modulation/demodulation unit 32 modulates information to be transmitted and demodulates information received. The modulation mode is selected from among BPSK, π/4-shift QPSK, and 16 QAM adaptively. While only a single terminal apparatus 10 is shown here, a plurality of terminal apparatuses 10 can be connected, in which case modulation and demodulation are performed in units of each terminal apparatus 10.

The interface unit 44 is in charge of establishing connection between the base station apparatus 12 and the network 46. The interface unit 44 converts a format of information to be modulated by the modulation/demodulation unit 32 and a format of information demodulated by the modulation/demodulation unit 32 into/from a format of information to be communicated over the network 46. An example of the network 46 is an ISDN (Integrated Services Digital Network). Here, the interface unit 44 shall have a physical configuration corresponding to the ISDN.

When the base station apparatus 12 establishes connection with the terminal apparatus 10, the time slot control unit 42 allocates time slots to the terminal apparatus 10, and outputs the time slot information 202, including an instruction of the allocated time slots, to the modulation/demodulation unit 32. Incidentally, if the communications with terminal apparatus 10 are conducted in packets and the number of terminal apparatuses in connection is greater than or equal to the number of time slots included in a single frame, the allocation of time slots to each single terminal apparatus 10 is such that time slots are allocated over consecutive frames for a time slot allocation period, are not allocated after the lapse of the time slot allocation period, and are allocated again over consecutive frames for a time slot allocation period. Meanwhile, the remaining period is calculated as will be described later.

The quality derivation unit 36 measures the quality of the received signal as that of the up-link signal. As with the quality measurement unit 22, the quality derivation unit 36 measures the intensity of a desired signal received, the intensity of an interference signal received, and the intensity ratio between the desired signal and the interference signal, which are measured of the signal or RSSI demodulated by the modulation/demodulation unit 32, as the quality of the received signal. For the quality of the down-link signal, information on the modulation mode determined by the modulation mode determination unit 20 is detected out of the signal received from the terminal apparatus 10. As an alternative to the information on the modulation mode determined by the modulation mode determination unit 20, the signal quality measured by the quality measurement unit 22 may be used. As with the time slot control unit 42, the processing described above is performed in units of each terminal apparatus 10.

The modulation mode control unit 34 determines the modulation modes of the up link and down link suitable for the quality of the up-link signal measured by the quality derivation unit 36 and the quality of the down-link signal detected by the quality derivation unit 36, respectively. When the signal quality is the intensity ratio between the desired signal and the interference signal, the modulation mode control unit 34 compares the intensity ratio between the desired signal and the interference signal with reference values previously stored in the storing unit 40 and determines the modulation modes. FIG. 2 shows the data structure of the storing unit 40. Here, like the modulation mode determination unit 20 described above, the storing unit 40 has two reference values, or "A" and "B." If the measured intensity ratio between the desired signal and the interference signal is higher than or equal to "A," the modulation mode is determined to be 16 QAM. If the measured intensity ratio between the desired signal and the interference signal is lower than "A" and higher than or equal to "B," the modulation mode is determined to be π/4-shift QPSK. If the measured intensity ratio between the desired signal and the interference signal is lower than "B," the modulation mode is determined to be BPSK.

In addition, the modulation mode control unit 34 detects information as to the remaining period, included in the period information 200 which is input/output from/to the time slot control unit 42. If the remaining period is greater then or equal to a threshold value, the modulation mode control unit 34 determines to change the modulation mode currently in use into the modulation mode determined as described above. If the remaining period is below the threshold value, the modulation mode control unit 34 determines to keep using the modulation mode currently in use without changing to the determined modulation mode.

The control unit 38 performs timing processing of the base station apparatus 12, processing of control signals, etc.

In terms of hardware, this configuration can be achieved by the CPU of an arbitrary computer, a memory, and other LSIs. In terms of software, it can be achieved by a program which is loaded on a memory and has reservation management facilities. The functional blocks shown here are achieved by the cooperation of these. It will thus be understood by those skilled in the art that these functional blocks may be achieved in various forms including hardware alone, software alone, and combinations thereof.

Figure 3:
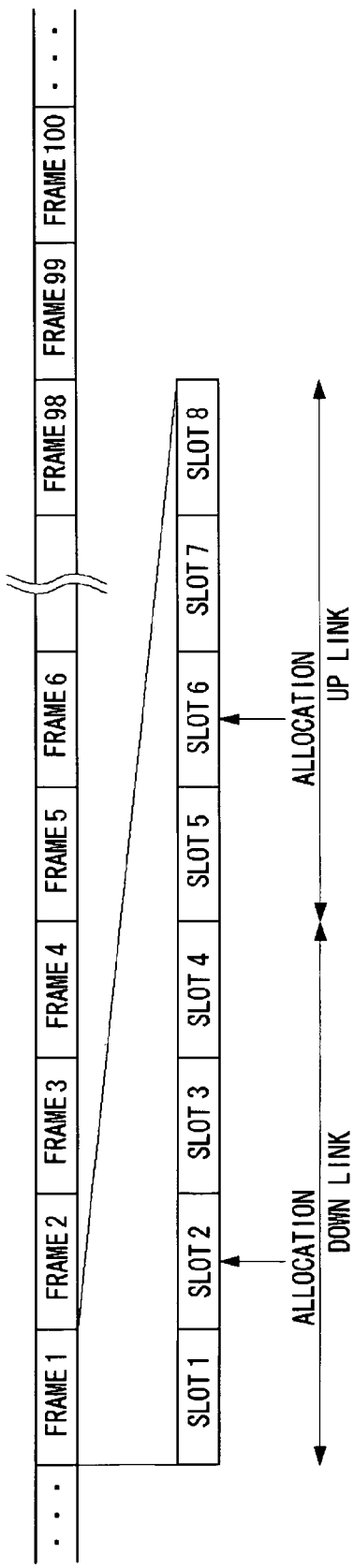
FIG. 3 shows a frame format of FIG. 1.

FIG. 3 shows a frame format according to the present embodiment. In this frame format, a plurality of frames is arranged in succession. Here, these frames are represented as "frame 1" to "frame 100," whereas not-shown other frames are also arranged in front and behind. Assuming that the time slot allocation period for a given terminal apparatus 10 consists of 100 frames, the "frame 1" to "frame 100" shown in the diagram correspond to a single time slot allocation period. Each single frame consists of eight time slots, which is the same configuration as that of the Personal Handyphone System. Here, these slots are represented as "slot 1" to "slot 8."

Of the eight time slots, four time slots or "slot 1" to "slot 4" are used for a down link. The remaining four, or "slot 5" to "slot 8," are used for an up link. The modulation mode control unit 34 determines the modulation modes for the "slot 1" to "slot 8" separately. The base station apparatus 12 allocates at least one up-link time slot and one down-link time slot to a single terminal apparatus 10. As shown in the diagram, the time slots allocated shall be "slot 2" and "slot 6."

Figure 4:
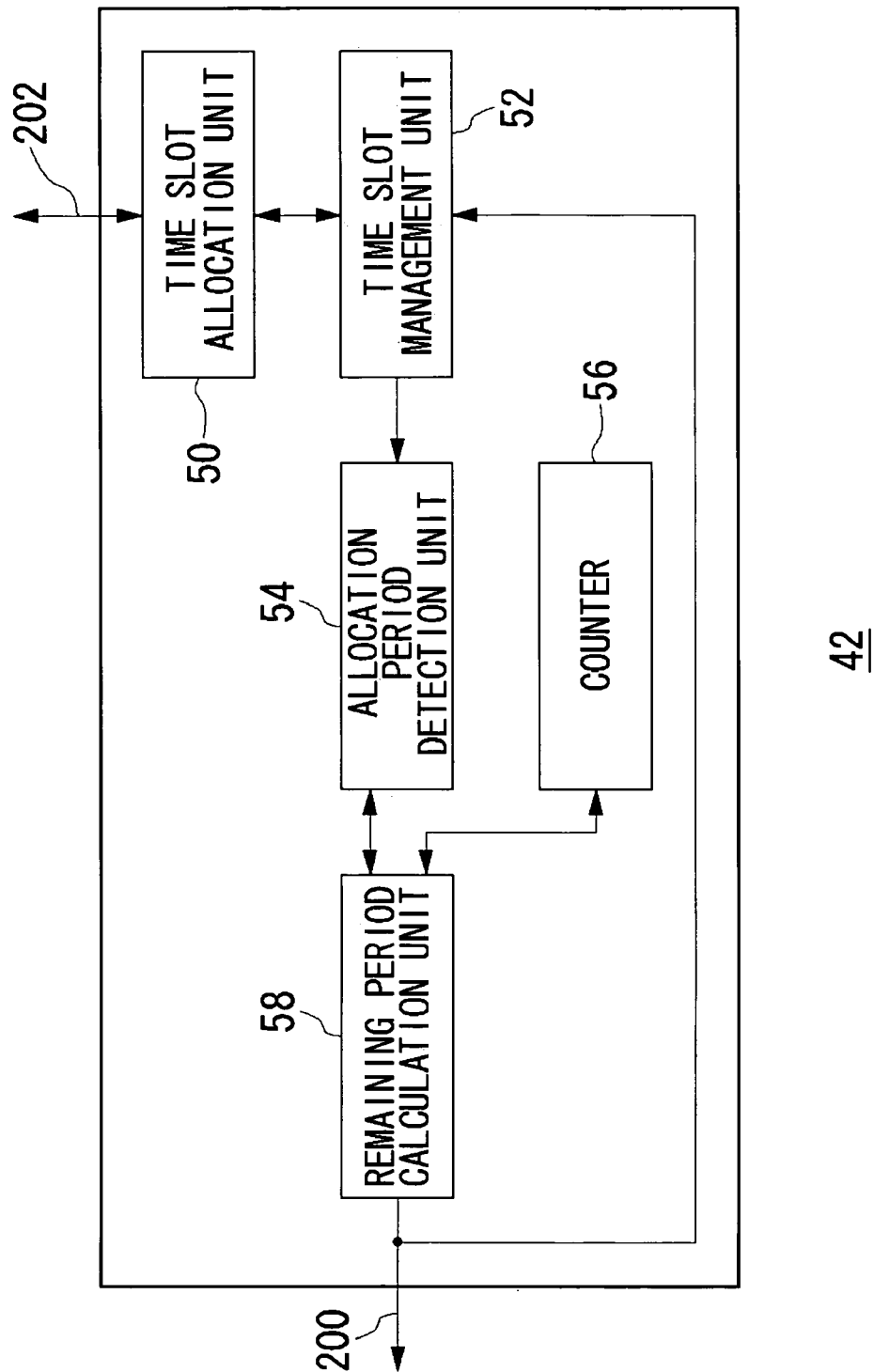
FIG. 4 shows the configuration of a time slot control unit of FIG. 1.

FIG. 4 shows the configuration of the time slot control unit 42. The time slot control unit 42 includes a time slot allocation unit 50, a time slot management unit 52, an allocation period detection unit 54, a counter 56, and a remaining period calculation unit 58.

The time slot allocation unit 50 allocates time slots to each of a plurality of terminal apparatuses 10 to communicate. The time slot allocation unit 50 also instructs the modulation/demodulation unit 32 of the allocated time slots by means of the time slot information 202, and accepts an allocation request for new time slots from the modulation/demodulation unit 32 by means of the time slot information 202.

The time slot management unit 52 manages information on the time slots allocated by the time slot allocation unit 50. The information to be managed includes the numbers of the time slots allocated to the terminal apparatuses 10 and the modulation modes currently in use. Time slot allocation periods shall also be included. FIG. 5 shows the data structure of allocated time slots to be managed by the time slot management unit 52. The "USER ID" field shows symbols for identifying terminal apparatuses 10. Here, the terminal apparatuses 10 are identified by alphabetical symbols like "AABBCCDD." Numerals may be used, however. Telephone numbers given to the terminal apparatuses 10 may also be used. The "ALLOCATED SLOTS" field shows time slots allocated to each terminal apparatus 10. For example, "#2,#6" shows that the "slot 2" is allocated for the down link and the "slot 6" is allocated for the up link. A plurality of time slots may be allocated for each of the up and down links.

The "slot classification" field shows time slot allocation periods. Here, for ease of processing, the time slot allocation periods shall not be established for the respective terminal apparatuses 10 separately. The time slot allocation periods are classified into two groups "α" and "β" so that the time slot allocation periods are enabled by group alternately. For example, if a time slot allocation period "α" is established for the "frame 1" to "frame 100," a time slot allocation period "β" for the "frame 101" to "frame 200," and a time slot allocation period "α" for the "frame 201" to "frame 300" are established again. The "MODULATION MODE (UP)" field shows the modulation modes currently used for the up links. The "MODULATION MODE (DOWN)" field shows the modulation modes currently used for the down links.

The allocation period detection unit 54 detects a time slot allocation period, or the end timing of the time slot allocation period in particular, from the information on time slots managed by the time slot management unit 52. Since the time slot allocation periods are stored as the slot classification "α" or "β" as described above, the allocation period detection unit 54 converts "α" or "β" into the timing or time at which the slot classification ends. For example, an end at "frame 100" or an end at "frame 300" is derived from "α."

The counter 56 counts up frame by frame, thereby managing the current timing and the frame number. Since the timing of operation of adaptive modulation is in units of frames, the count itself corresponds to the planned timing of the change of the modulation mode, i.e., the scheduled timing mentioned previously.

The remaining period calculation unit 58 calculates the remaining period from the end timing of the time slot allocation period and the scheduled timing. For example, when the end timing of the time slot allocation period is "frame 300" and the scheduled timing is "frame 250," the remaining period is "50." The remaining period calculation unit 58 outputs the period information 200 including the calculation of the remaining period. The period information 200 is also used when the modulation mode control unit 34 of FIG. 1 extracts management information from the time slot management unit 52.

Figure 6:
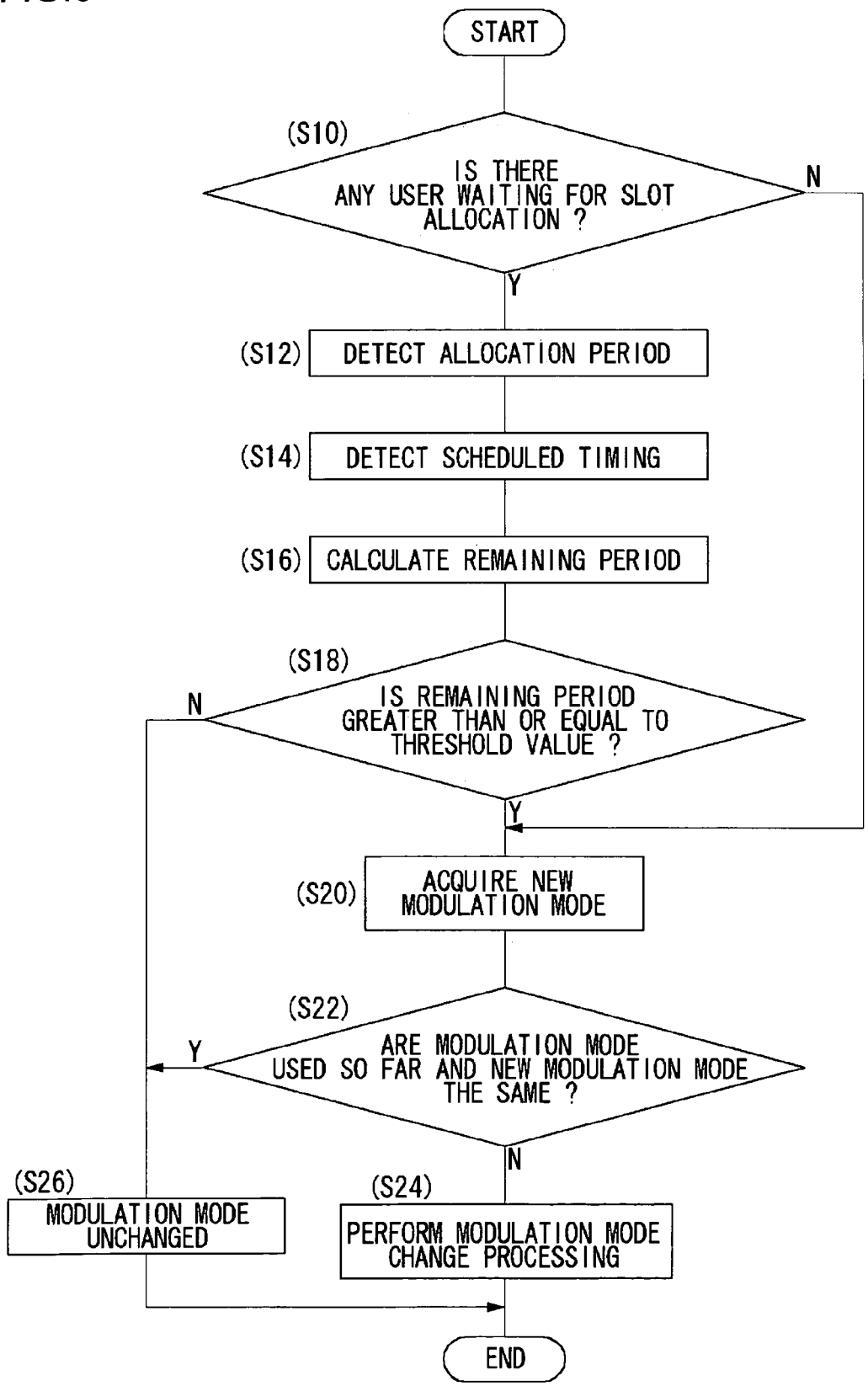
FIG. 6 is a flowchart showing a procedure for changing a modulation mode of FIG. 1.

FIG. 6 is a flowchart showing the procedure for changing a modulation mode. As described previously, the processing for changing a modulation mode shall be performed in units of frames. The time slot management unit 52 checks the information on the allocated time slots for the presence of any user who is waiting for slot allocation. For example, in the case of a base station apparatus 12 that allocates time slots to the terminal apparatuses 10 of three users in a single frame, there is some user waiting for slot allocation if the number of terminal apparatuses 10 stored in the time slot management unit 52 is greater than or equal to 4. If there is any user waiting for slot allocation (Y at S10), the allocation period detection unit 54 detects a time slot allocation period from the time slot management unit 52 (S12). The counter 56 detects the scheduled timing (S14). The remaining period calculation unit 58 calculates the remaining period from the time slot allocation period and the scheduled timing (S16).

The modulation mode control unit 34 compares the remaining period with the threshold value, and if the remaining period is greater then or equal to the threshold value (Y at S18), acquires a new modulation mode based on the link quality derived by the quality derivation unit 36 (S20). Now, if the time slot management unit 52 detects that there is no user who is waiting for slot allocation (N at S10), the modulation mode control unit 34 acquires a new modulation mode. If the modulation mode used so far and the modulation mode acquired newly are not the same (N at S22), modulation mode change processing is performed (S24). On the other hand, if the remaining period compared in the modulation mode control unit 34 is not equal to nor above the threshold value (N at S18), or if the modulation mode used so far and the modulation mode acquired newly are the same (Y at S22), the modulation mode will not be changed (S26).

Figure 7:
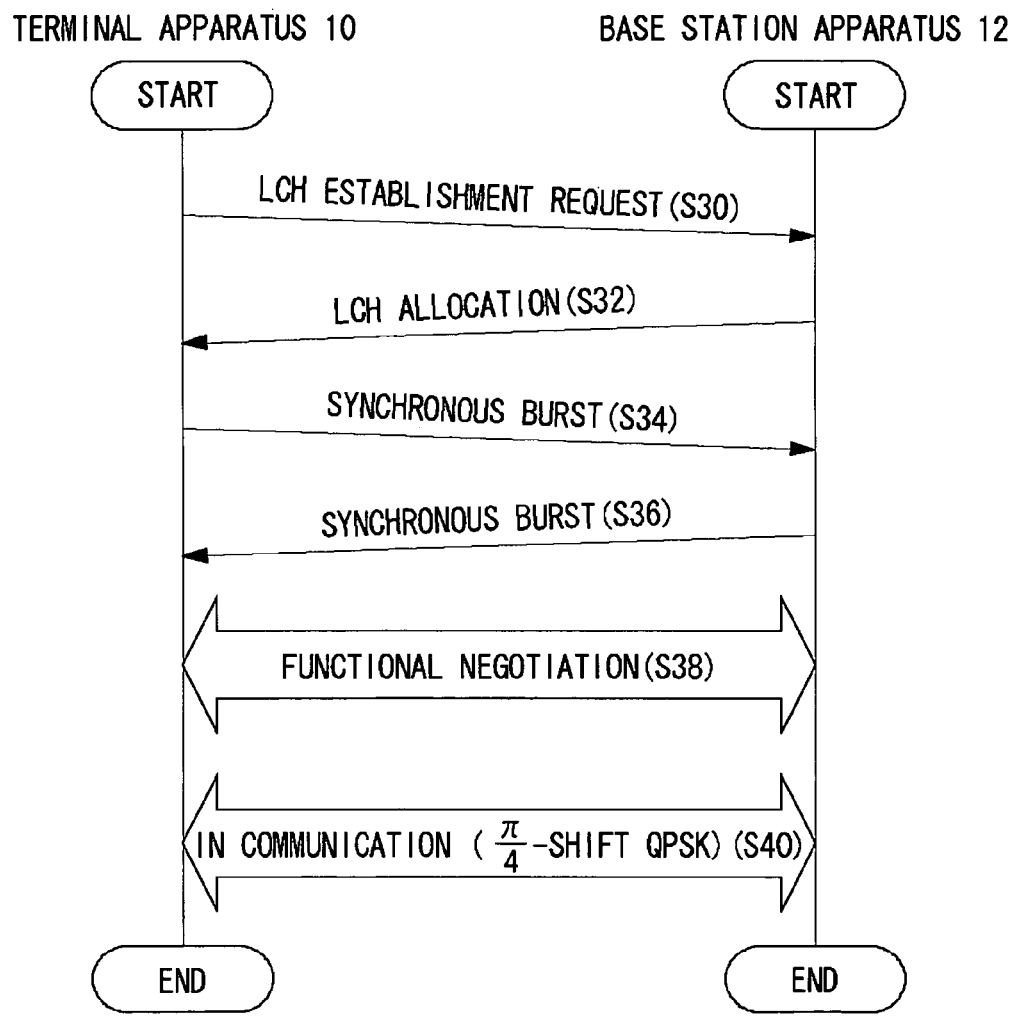
FIG. 7 is a sequence diagram showing communication start processing of FIG. 1.

FIG. 7 is a sequence diagram showing communication start processing. This processing does not perform adaptive modulation, but corresponds to preprocessing for adaptive modulation. The terminal apparatus 10 outputs an LCH (Link Channel) establishment request in order to establish a new connection with the base station apparatus 12 (S30). When the time slot control unit 42 of the base station apparatus 12 allocates time slots, i.e., an LCH to this terminal apparatus 10, it outputs an LCH allocation to the terminal apparatus 10 (S32). To establish synchronization at upper layers of the communication protocol, the terminal apparatus 10 outputs a synchronous burst to the base station apparatus 12 by using the time slot allocated (S34).

The base station apparatus 12 outputs a synchronous burst response to the terminal apparatus 10 (S36). When it becomes possible for the terminal apparatus 10 and the base station apparatus 12 to exchange predetermined information therebetween, the terminal apparatus 10 and the base station apparatus 12 perform functional negotiations including the processing for exchanging information on processible modulation modes (S38). The terminal apparatus 10 and the base station apparatus 12 communicate by using predetermined π/4-shift QPSK initially (S40). This stage does not involve adaptive modulation since no processing as to link quality is performed yet.

FIG. 8 is a sequence diagram showing modulation mode change processing for a down link. As in step S40 of FIG. 7, the terminal apparatus 10 and the base station apparatus 12 communicate by using π/4-shift QPSK (S50). The quality measurement unit 22 of the terminal apparatus 10 measures the link quality from the signal received (S52). Based on the link quality measured, the modulation mode determination unit 20 determines the modulation mode to request of the base station apparatus 12 to be 16 QAM (S54). In addition, a modulation mode switch request signal including the information on the modulation mode to request is transmitted from the terminal apparatus 10 to the base station apparatus 12 (S56). The time slot control unit 42 and the modulation mode control unit 34 of the base station apparatus 12 judge the scheduling condition (S58), i.e., determine if the remaining period calculated by the time slot control unit 42 is greater then or equal to the threshold value.

The modulation mode control unit 34 determines to change the modulation mode from π/4-shift QPSK to 16 QAM (S60). The base station apparatus 12 transmits a modulation mode notification signal to instruct the terminal apparatus 10 of the change to the modulation mode determined (S62). To switch the modulation mode, the terminal apparatus 10 and the base station apparatus 12 perform modulation mode switch processing therebetween, including resynchronization processing (S64). Subsequently, the terminal apparatus 10 and the base station apparatus 12 communicate by using 16 QAM (S66). Note that if the remaining period is determined to be below the threshold value at step S58, the modulation mode control unit 34 will not perform the change of the modulation mode. As a result, the processing of steps S62 and S64 is omitted. Since data can be communicated even over the period necessary for this processing, it is possible to avoid deterioration in transmission efficiency.

FIG. 9 is a sequence diagram showing modulation mode change processing for an up link. As in step S40 of FIG. 7, the terminal apparatus 10 and the base station apparatus 12 conduct communication by using π/4-shift QPSK (S70). The quality derivation unit 36 of the base station apparatus 12 measures the link quality from the signal received (S72). The time slot control unit 42 and the modulation mode control unit 34 judge the scheduling condition (S74), i.e., determine if the remaining period calculated by the time slot control unit 42 is greater then or equal to the threshold value. Based on the link quality measured, the modulation mode control unit 34 determines to change the modulation mode from π/4-shift QPSK to 16 QAM (S76).

The base station apparatus 12 transmits a modulation mode notification signal to instruct the terminal apparatus 10 of the change to the modulation mode determined (S78). To switch the modulation mode, the terminal apparatus 10 and the base station apparatus 12 perform modulation mode switch processing therebetween, including resynchronization processing (S80). Subsequently, the terminal apparatus 10 and the base station apparatus 12 communicate by using 16 QAM (S82). As with the down link, if the remaining period is determined to be below the threshold value at step S74, the modulation mode control unit 34 will not perform the change of the modulation mode. As a result, the processing of steps S78 and S80 is omitted. Since data can be communicated even over the period necessary for this processing, it is possible to avoid deterioration in transmission efficiency.

Now, an example will be given of the threshold value to be compared with the remaining period by the modulation mode control unit 34 according to the present embodiment. Suppose here that the "time slot allocation period" is "100 frames," a "modulation mode switch period" at step S64 of FIG. 8 and step S80 of FIG. 9 is "10 frames," the "size of data capable of transmission within a single time slot in a modulation mode of π/4-shift QPSK" is "160 bits," and the "size of data capable of transmission within a single time slot in a modulation mode of 16 QAM" is "320 bits." When π/4-shift QPSK is used throughout the time slot allocation period, it is possible to transmit 16000 bits.

Now, if the modulation mode is changed from π/4-shift QPSK to 16 QAM at the zth frame in the time slot allocation period, the amount of data, transmitted by π/4-shift QPSK is 160×z bits and the amount of data transmitted by 16 QAM is 320×(90−z) bits. The change of the modulation mode can improve the transmission efficiency if the sum of the amount of data transmitted by π/4-shift QPSK and the amount of data transmitted by 16 QAM exceeds the amount of data fully transmitted by π/4-shift QPSK. Such z is calculated to be smaller than 80. Consequently, the threshold value is 21. That is, the modulation mode control unit 34 changes the modulation mode from π/4-shift QPSK to 16 QAM if the remaining period is greater then or equal to 21 frames.

Description will now be given of the operation of the base station apparatus 12 which has the foregoing configuration. The time slot allocation unit 50 allocates time slots to a terminal apparatus 10 to communicate. Moreover, the time slot management unit 52 manages the time slots allocated. The allocation period detection unit 54 detects the time slot allocation period for the terminal apparatus 10, from the time slot management unit 52. Based on the time slot allocation period detected, the allocation period detection unit 54 identifies the end timing of the time slot allocation period.

The counter 56 performs counting, and outputs the scheduled timing for performing adaptive modulation on the terminal apparatus 10. The remaining period calculation unit 58 calculates the remaining period from the end timing of the time slot allocation period and the scheduled timing. If the remaining period is smaller than the threshold value, the modulation mode control unit 34 determines not to change the current modulation mode. On the other hand, if the remaining period is greater than or equal to the threshold value, the modulation mode control unit 34 acquires the link quality of both the up link and down link from the quality derivation unit 36, and determines modulation modes to be used newly based on the acquired channel quality. The modulation mode control unit 34 also notifies the terminal apparatus 10 of the modulation modes determined. Finally, the modulation/demodulation unit 32 performs modulation/demodulation processing in the changed modulation modes.

According to the present embodiment, the base station apparatus derives the remaining period of the time slots allocated to a given terminal apparatus, and compares the derived remaining time of the time slots and the period necessary for modulation mode change processing before it changes the modulation mode. Thus, unless the change of the modulation mode improves the data transmission efficiency, the modulation mode can be kept unchanged to avoid deterioration in the data transmission efficiency.

The present invention has been described based on the embodiments which are only exemplary. It is understood by those skilled in the art that there exist other various modifications to the combination of each component and process described above and that such modifications are encompassed by the scope of the present invention.

In the present embodiment, the communication system 100 is targeted for the Personal Handyphone System. This is not restrictive, however. For example, TDMA-based cellular mobile phone systems and the like are also applicable. According to this modification, the present invention can be applied to various communication systems. In other words, what is essential is only that channels allocated to terminal apparatuses have some temporal limitations.

In the present embodiment, the modulation/demodulation unit 32 and the modulation mode control unit 34 handle different modulation modes such as BPSK and 16 QAM as means for changing transmission rates adaptively. This is not restrictive, however. For example, it is possible to manipulate the encoding rates of error correction. The modulation modes and the encoding rates of error correction may be manipulated in combination. According to this modification, finer settings can be made of the transmission rates. In other words, what is essential is only that a plurality of transmission rates be achieved.

In the present embodiment, the quality derivation unit 36 and the modulation mode control unit 34 control the modulation modes for up and down links separately. This is not restrictive, however. For example, while the quality derivation unit 36 measures the link quality of the up link from the received signal, the modulation mode control unit 34 may determine a modulation mode common to the up and down links based on the link quality measured. Otherwise, based on the single link quality measured by the quality derivation unit 36, the modulation mode control unit 34 may determine both the modulation modes of the up and down links by using threshold values provided for the up and down links separately. According to this modification, it is possible to reduce the processing necessary to determine the modulation modes. In other words, what is essential is only that the modulation modes be determined based on actual link quality.

In the present embodiment, the remaining period calculation unit 58 calculates the remaining period from the scheduled timing and the time slot allocation period. This is not restrictive, however. For example, the counting by the counter 56 may be replaced with such control as subtracting the time slot allocation period from a predetermined value, so that the value of the subtraction of the time slot allocation period shows the remaining period as is. According to this modification, the processing can be simplified further. That is, what is essential is only that the remaining period can be checked under a predetermined rule.

Although the present invention has been described by way of exemplary embodiments, it should be understood that many changes and substitutions may further be made by those skilled in the art without departing from the scope of the present invention which is defined by the appended claims.

What is claimed is:

1. A base station apparatus comprising:
a communication unit which communicates with a terminal apparatus at variable transmission rates;
a channel allocation unit which allocates predetermined ones of a plurality of time slots included in a frame, such that time slots in a plurality of frames consecutive over a predetermined period are allocated to the terminal apparatus, and time slots in a plurality of frames consecutive over a period other than the predetermined period are allocated to another terminal apparatus;
a change planning unit which plans timing for changing a transmission rate for the terminal apparatus in a period which is defined by a plurality of frames and in which the time slots are allocated; and
a change determination unit which determines to change the transmission rate for the terminal apparatus if a remaining period, occurring between a change in the transmission rate planned by the change planning unit and an end of the period defined by the plurality of frames and in which the time slots are allocated, is equal to or greater than a threshold value, and determines not to change the transmission rate for the terminal apparatus if the remaining period is not equal to or greater than the threshold value.

2. The base station apparatus according to claim 1, further comprising a link quality derivation unit which derives link quality with respect to the terminal apparatus, wherein
the change determination unit derives a remainder of the period defined by the plurality of frames for the case of changing the transmission rate, based on a length of the period which is defined by the plurality of frames and in which the time slots are allocated and the planned timing for changing the transmission rate, and further determines to perform the change of the transmission rate based on the derived link quality if the derived remainder of the period defined by the plurality of frames is equal to or greater than a threshold value.

3. The base station apparatus according to claim 2, wherein
for the link quality with, respect to the terminal apparatus, the link quality derivation unit measures link quality based on a signal received from the terminal apparatus.

4. The base station apparatus according to claim 2, wherein
for the link quality with respect to the terminal apparatus, the link quality derivation unit detects information on link quality which is included in a signal received from the terminal apparatus.

5. A transmission rate changing method comprising:
allocating predetermined ones of a plurality of time slots included in a frame, such that time slots in a plurality of frames consecutive over a predetermined period are allocated to a terminal apparatus, and time slots in a plurality of frames consecutive over a period other that the predetermined period are allocated to another terminal apparatus;
planning timing for changing a transmission rate for the terminal apparatus in a period which is defined by a plurality of frames and in which the time slots are allocated; and
determining to change the transmission rate for the terminal apparatus if a remaining period, occurring between a planned change in the transmission rate and an end of the period defined by the plurality of frames and in which the time slots are allocated, is equal to or greater than a threshold value, and determining not to change the transmission rate for the terminal apparatus if the remaining period is not equal to or greater than the threshold value.

6. The transmission rate changing method according to claim 5, further comprising deriving link quality with respect to the terminal apparatus, wherein
the determining includes deriving a remainder of the period which is defined by the plurality of frames for the case of changing the transmission rate from a length of the period which is defined by the plurality of frames and in which the time slots are allocated and the planned timing for changing the transmission rate, and includes determining to perform the change of the transmission rate based on the derived link quality if the derived remainder of the period defined by the plurality of frames is equal to or greater than a threshold value.

7. The transmission rate changing method according to claim 6, wherein
in deriving the link quality with respect to the terminal apparatus, link quality based on a signal received from the terminal apparatus is measured as the link quality with respect to the terminal apparatus.

8. The transmission rate changing method according to claim 6, wherein
in deriving the link quality with respect to the terminal apparatus, information on link quality included in a signal received from the terminal apparatus is detected as the link quality with respect to the terminal apparatus.

9. A computer-readable medium storing a program which makes a computer execute:
allocating predetermined ones of a plurality of time slots included in a frame, such that time slots in a plurality of frames consecutive over a predetermined period are allocated to a terminal apparatus, and time slots in a plurality of frames consecutive over a period other than the predetermine period are allocated to another terminal apparatus;
planning timing for changing a transmission rate for the terminal apparatus in a period which is defined by a plurality of frames and in which the time slots are allocated; and
determining to change the transmission rate for the terminal apparatus if a remaining period, occurring between a planned change in the transmission rate and an end of the period defined by the plurality of frames and in which the time slots are allocated, is equal to or greater than a threshold value, and determining not to change the transmission rate for the terminal apparatus if the remaining period is not equal to or grater than the threshold value between a planned change in the transmission rate and an end of the channel-allocated period.

10. The computer-readable medium according to claim 9, which further makes a computer execute: deriving link quality with respect to the terminal apparatus via the wireless network, wherein the determining includes deriving a remainder of the period which is defined by the plurality of frames for the case of changing the transmission rate from a length of the period which is defined by the plurality of frames and in which the time slots are allocated and the planned timing for changing the transmission rate, and includes determining to perform the change of the transmission rate based on the derived link quality if the derived remainder of the period defined by the plurality of frames is equal to or greater than a threshold value.

11. The computer-readable medium according to claim 10, wherein in deriving the link quality with respect to the terminal apparatus via the wireless network, link quality based on a signal received from the terminal apparatus via the wireless network is measured as the link quality with respect to the terminal apparatus.

12. The computer-readable medium according to claim 10, wherein in deriving the link quality with respect to the terminal apparatus via the wireless network, information on link quality included in a signal received from the terminal apparatus via the wireless network is detected as the link quality with respect to the terminal apparatus.

\* \* \* \* \*